United States Patent [19]
Krohn

[11] 4,397,610
[45] Aug. 9, 1983

[54] RECIPROCABLE PUMP WITH VARIABLE SPEED DRIVE

[75] Inventor: Duane D. Krohn, Westminister, Colo.

[73] Assignee: Graco Inc., Minneapolis, Minn.

[21] Appl. No.: 241,669

[22] Filed: Mar. 9, 1981

[51] Int. Cl.³ .............................................. F04B 49/06
[52] U.S. Cl. ...................................... 417/44; 307/118
[58] Field of Search ..................... 417/18, 44; 307/118

[56] References Cited
U.S. PATENT DOCUMENTS

| | | | |
|---|---|---|---|
| 2,395,057 | 2/1946 | Dinsmore | 417/440 X |
| 3,405,340 | 12/1968 | Ankenman | 318/336 |
| 3,985,467 | 10/1976 | Jefferson | 417/44 X |

Primary Examiner—Alan Cohan

[57] ABSTRACT

A reciprocable liquid pump driven by a direct current electric motor wherein the motor drive voltage, and thereby pump reciprocation, and output pressure, is selectively controlled by a circuit including an electromechanical transducer coupled in pressure sensing relation to the liquid pump output, a manually operable pressure set point switch, and a silicon-controlled rectifier circuit.

13 Claims, 7 Drawing Figures

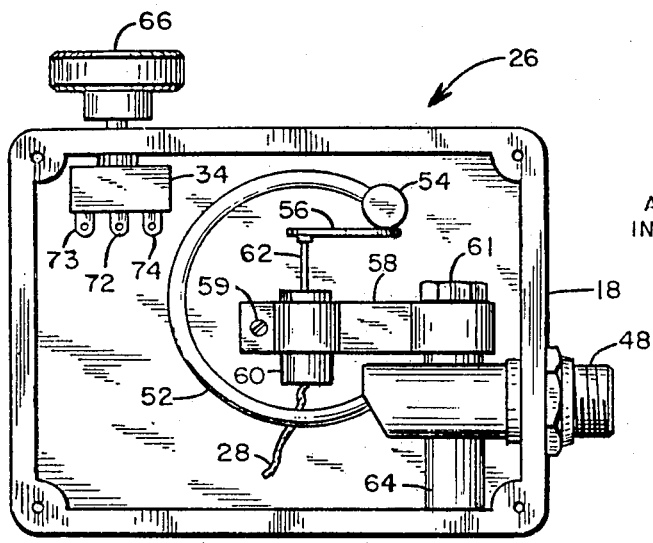
Fig. 3
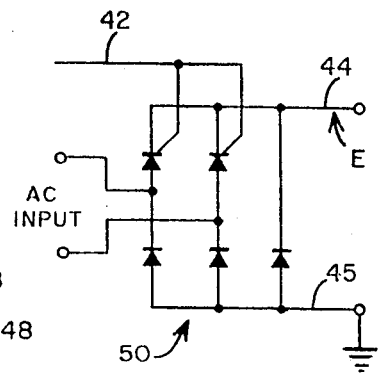
Fig. 5
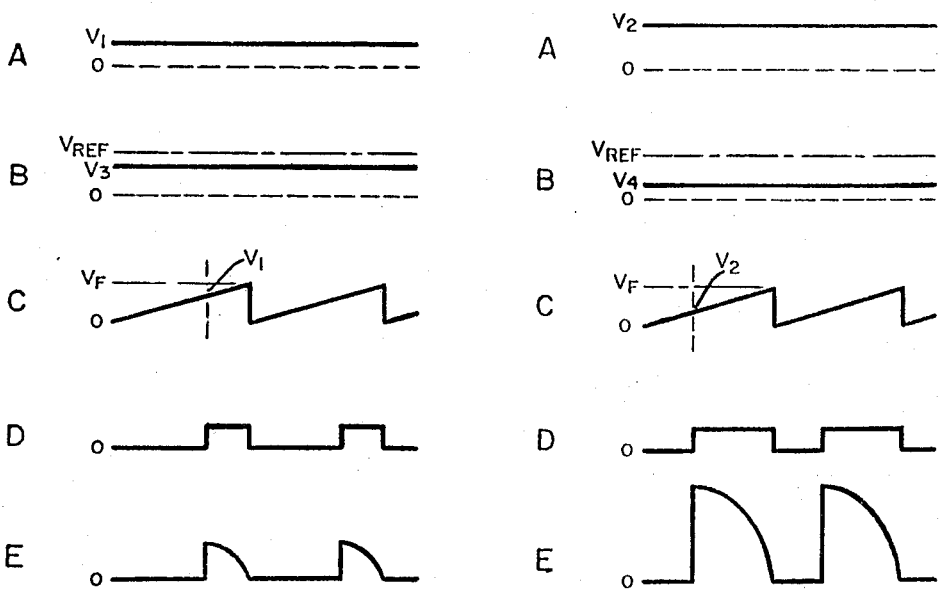
Fig. 6A
Fig. 6B

RECIPROCABLE PUMP WITH VARIABLE SPEED DRIVE

BACKGROUND OF THE INVENTION

This invention relates to liquid pumps, and more particularly to liquid pumps for delivering liquids at relatively high pressures under precise pressure regulation and control.

In the fluid handling field innumerable approaches have been devised for the delivery of pressurized liquids of widely ranging viscosities; one subset of this field encompasses linear drive or reciprocable pumps, usually including a piston and cylinder combination, with appropriate valving, wherein the piston is mechanically reciprocated within the cylinder to deliver liquids at predetermined pressures. Hydraulically driven motors have been used as the drive mechanism for the piston apparatus, wherein the output liquid pressure is a function of the hydraulic coil pressure delivered to the drive motor. Similarly, air-operated motors have been used as a power source, wherein the output liquid pressure is a function of the air pressure delivered to the air motor. In both of these instances, the drive motor operates until a balance exists between the input fluid pressure to the drive source and the output liquid pressure from the pump, whereupon a stall condition persists until one pressure or the other is varied. Systems of this type provide a convenient pressure control alternative by virtue of the inherent motor "stall" capability, but they suffer from the disadvantage of requiring externally powered sources of either air or hydraulic oil pressure. This requires additional equipment which is both expensive and bulky, and because of this pumps of this general class tend to be rather nonportable, being best adapted for fixed locations such as may be found in industrial plant locations.

Electrical drive motors have been used to power reciprocable pumps through intermediate crank shafts or gearing arrangements, particularly when it is desirable to construct such a pump which may be portable. The advantages of an electrical drive source lie in the fact that electrical power is readily available in practically all locations, and the pumping system may be designed in relatively compact form. Alternating current (AC) drive motors have been used in this application, together with pressure sensing devices coupled to the pump output pressure line, wherein the electric motor is turned on and off as the pump output liquid pressure varies. An example of this type of system is disclosed in U.S. Pat. No. 3,614,352, issued Oct. 14, 1971, and owned by the assignee of the present invention. In portable paint systems, pumps of this type have been coupled to paint delivery hoses of one hundred feet or more in length, with a paint spray gun connected to the end of the paint hose, and the pump has adequately delivered paint from a supply source through the spray gun for industrial and commercial painting applications. Typically, such paint pumps have been portable in nature, frequently being mounted on a wheeled frame assembly, and are in wide use by professional painting contractors and others engaged in the painting industry. Such systems have suffered from a disadvantage in the ability to control and regulate pressure, for the pressure control mechanism is typically designed to provide a fairly wide range between the pressure set points, activating the electric drive motor when paint pressure drops to a predetermined set point and shutting off the electric drive motor when the pressure rises to a second set point which may be 400-800 pounds per square inch (psi) higher than the low setpoint. This provides a delivery system wherein the output liquid, preferably paint, is delivered at widely fluctuating pressures, depending upon the "deadband" or on-off differential of the system. While this pressure fluctuation is adequate for many painting applications, it does affect the quality of atomization of paint being delivered by the system and in some applications adversely affects the quality of paint finish applied by the system. It is therefore desirable to reduce the pressure fluctuation range over which such systems operate. When the reduction in pressure on-off differential is attempted in prior art systems of the type described, the result is that the AC drive motor is turned on and off at frequent intervals. This frequently causes overheating of the motor, which can damage the motor and disable the system.

The problem of excessively high on-off differentials is also found in systems driven by air or hydraulic motors. In such systems, friction and other effects create excessively wide ranging pressure on-off differentials, which are difficult to correct in the design of the motor and the pressure regulation mechanism.

Direct current (DC) drive motors have also been used in reciprocable pumping systems to provide constant liquid pressure in a system driving multiple and variable liquid loads. An example of this type of system is shown in U.S. Pat. No. 3,985,467, issued Oct. 12, 1976, wherein two variable gain amplifier stages are used to drive a phase lock loop DC motor control circuit. The gain of one amplifier stage is controlled inversely to pump output pressure, and the gain of the second amplifier stage is controlled proportional to liquid flow through the pumping system. Such a system is used to drive a plurality of liquid outputs, one or more of which may be open at any given time. During system startup, when pressure and flow rate conditions are unstable, the two amplifier stages are circumvented by other special amplifier circuits, the aim of the invention being to maintain constant output pressure once stable output flow and pressure conditions exist.

SUMMARY OF THE INVENTION

The present invention provides improvements in pressure regulation and control for pumping systems, preferably pumping systems adapted for portable paint spraying equipment, wherein the pressure fluctuation range may be reduced by at least an order of magnitude from prior art systems. The invention includes a direct current (DC) motor mechanically coupled in driving relationship to a reciprocable pump, wherein the pump output pressure is monitored by an electromechanical sensing device which delivers a voltage signal proportional to pump output pressure. The voltage signal is connected to an electronic circuit which has as another input a manual voltage setting for adjusting a setpoint pressure, the setpoint signal and pressure signal being compared and the difference between the two signals generating an error drive signal which is amplified and compared against a DC voltage reference and a timing signal. The combination of the timing signal and the error drive signal is used to develop a gating signal over a portion of the timing signal period. The gating signal is fed into a silicon controlled rectifier (SCR) circuit for controlling the gating time of the silicon controlled rectifier circuit so as to regulate the DC drive voltage into the motor. When the set point and pressure signals become equal the SCR voltage drive into the motor drops to near zero, but motor drive current remains at the level necessary to develop sufficient motor torque to hold the pump output pressure at the set point value. Under other set point and pressure signal conditions a DC drive signal is coupled into the motor to provide a DC drive voltage of sufficient magnitude to reciprocate the pump and thereby incrementally increase the pump output pressure to the set point value.

It is a principal object of the present invention to provide an electric motor-driven reciprocable pump system having precise pressure regulation and control over a variable liquid flow rate range from zero to some design maximum.

It is another object of the present invention to provide a reciprocable pump with DC motor drive and a variable voltage electrical signal into the motor.

It is yet another object of the present invention to provide an electromechanical pressure sensor coupled to the pump output line for generating a voltage signal representative of output pressure.

It is a further object of the present invention to provide an electronic circuit which will deliver a variable DC voltage in response to an error drive signal developed by the difference between a pressure sensing signal and a pressure set point signal.

These and other objects and advantages will become apparent from the appended specification hereto, and with reference to the drawings which are described hereafter.

BRIEF DESCRIPTION OF THE DRAWINGS

FIG. 3 shows the pressure transducer of the present invention; and

FIG. 5 shows a schematic diagram of a second portion of the invention; and

FIGS. 6A and 6B show pertinent voltage waveforms under two operating conditions.

DESCRIPTION OF THE PREFERRED EMBODIMENT

Figure 1:
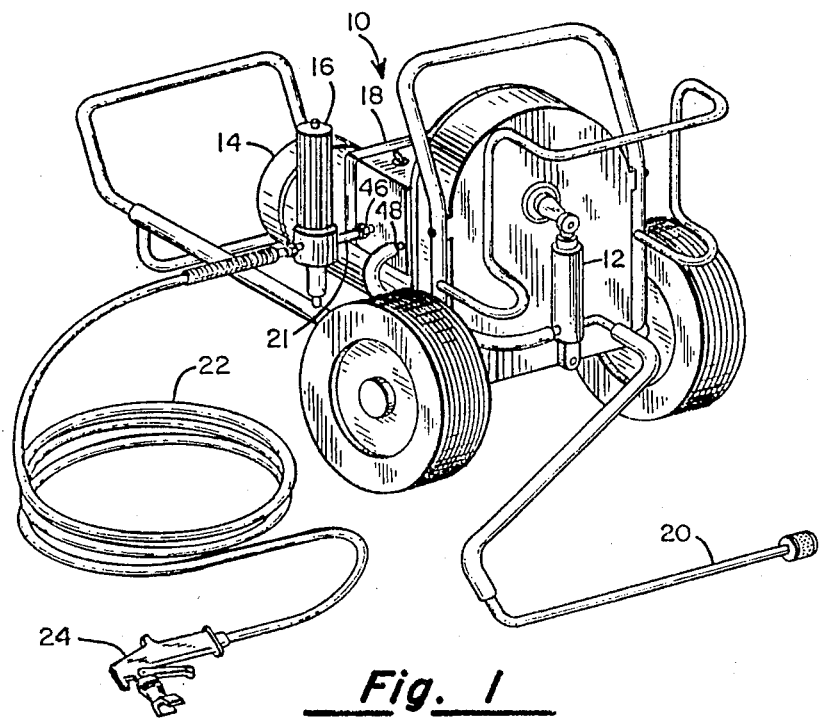
FIG. 1 shows the invention in perspective view.

Referring first to FIG. 1, the invention is shown in perspective view. A pumping system 10 has a reciprocable pump 12 mechanically coupled to an electric motor 14. Motor 14 is controlled by an electronic control circuit in housing 18, which circuit is also coupled via a pressure transducer to sense the liquid pressure delivered by pump 12. A suction pipe 20 is adapted for immersion into a container of liquid, preferably paint, for supplying pump 12. The liquid delivered by pump 12 is fed through a filter 16 and a hose 22 to a spray gun 24. Hose 22 may be twenty-five feet to more than several hundred feet in length, and spray gun 24 is preferably adapted for the atomization of the liquid, preferably paint, into fine droplets for spraying onto a workpiece. Pumping system 10 is preferably adapted for providing liquid paint at pressures upwards of 3,000 psi, and delivering paint at the rate of 0-1 gallon per minute (GPM), although the inventive concepts taught herein are equally applicable to both larger and smaller pumping systems.

Figure 2:
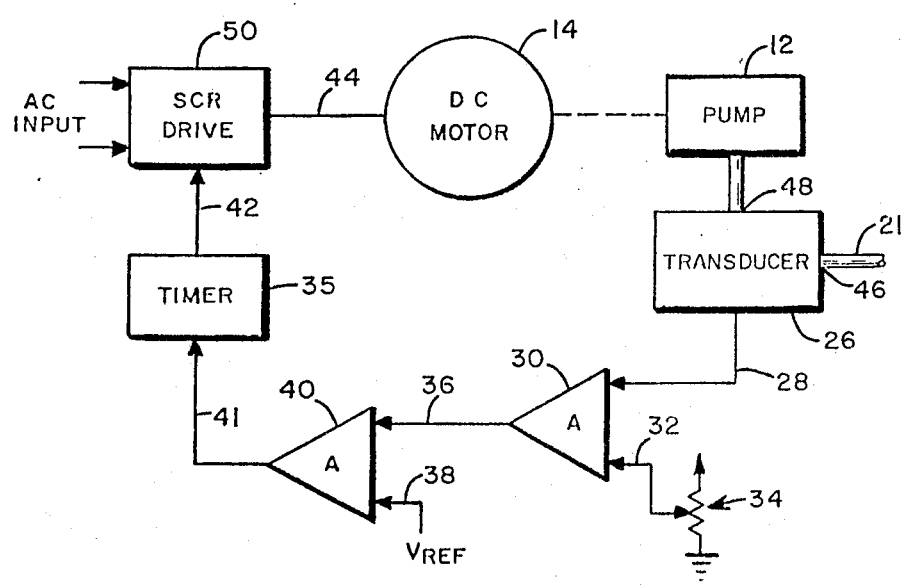
FIG. 2 shows a symbolic diagram of the invention.

Referring next to FIG. 2, a symbolic diagram of the invention is shown wherein DC motor 14 is mechanically coupled to pump 12, and the electromechanical devices for controlling motor 14 are shown in several boxes. Pump 12 delivers liquid, preferably paint, through a flow-through transducer 26 to a fluid delivery line 21 which may be connected to a filter 16 and a hose 22. Fluid delivery line 21 passes through a pressure/voltage transducer 26 which has an electrical signal output line 28. The signal on line 28 is an electrical voltage proportional to the liquid pressure in delivery line 21, and it is coupled to an input terminal of comparator 30. A second input to comparator 30 is a DC voltage level signal coupled to an input of comparator 30 via line 32. Line 32 is connected to a pressure set point potentiometer 34 which may be adjusted to vary the DC voltage level signal. The output of comparator 30 is coupled to a comparator 40 input via line 36, and a second input line 38 carries a reference voltage $V_{REF}$.

The output of comparator 40 is coupled to a timer circuit 35 via line 41. Timer circuit 35 functions to develop a timed gating signal for controlling the turn-on timing of SCR drive circuit 50. SCR drive circuit 50 also has inputs connected to receive alternating current from a utility power source, typically 110 volts AC at 60 cycles per second (CPS). The output of SCR drive circuit 50 is a DC signal delivered to motor 14 over line 44. The DC signal on line 44 is a voltage proportional to the difference between the pressure set point signal and the pressure sense signal, and serves to drive motor 14 at a rate of speed calculated to increase the pump 12 output volume until the pump output pressure equals the pressure set point.

Referring next to FIG. 3, the pertinent construction details of pressure/voltage transducer 26 are shown. A housing 18, preferably constructed to meet trade specifications for electrical enclosures, encloses the electrical circuitry required for the operation of the invention. Housing 18 has a liquid inlet 48 and a liquid outlet 46 passing through a sidewall, each of which are coupled to a tube 52. Tubes 52 have a free end manifold 54 which has a plate 56 fixedly attached thereto. The combination of tubes 52, manifold 54 and plate 56 operate as a pressure responsive device, wherein increasing liquid pressures within the device operate to deflect plate 56 upwardly and decreasing liquid pressures operate to deflect plate 56 downwardly. A detailed description of a pressure responsive device similar to that shown in FIG. 3 may be found in U.S. patent application Ser. No. 153,443, filed May 27, 1980, entitled "Fluid Pressure Sensor".

A linear variable differential transformer 60 is clamped against a bar 58 threaded fastener 59. A movable core rod 62 projects from transformer 60 and contacts plate 56. Linear variable differential transformer 60 may be a commercially available product, as for example, a product manufactured by Pickering & Co., of Plainview, New York, as Model designation 7304-W2-A0. This model includes a precision differential transformer, a solid state multivibrator, and a bridge-type demodulator packaged in a rugged metal case. The differential transformer 60 is designed to provide excellent inherent linearity with the primary and secondary windings chosen to match the multivibrator and demodulator. The multivibrator operating frequency is chosen to achieve optimum linearity, null shift and sensitivity change with temperature, as well as minimum power dissipation. The multivibrator is a conventional arrangement which alternately interrupts the current through either side of a center-tapped primary winding, producing a square wave voltage across it. The switching period is determined not by the saturation level of the transformer core, but by the transistor characteristics, the L-R time constant of the transformer primary inductance and the transistor coupling and biasing networks. These characteristics and contributing components are controlled in the unit to produce the desired performance. A pair of transistors is used in a push-pull configuration with their collectors connected to the ends of the transformer primary. The positive side of a six-volt DC power source is connected to the center tap. The collector of each transistor is brought to the base of the opposite transistor through a resistive divider providing positive feedback and operating bias. The emitters of the two transistors are joined and returned to the negative side of the power source through a common temperature compensating resistor. This emitter resistor resistance is bypassed with a capacitor to assure turn-on at low temperatures. In the aforementioned model designation, the output voltage signal on line 28 is linearly related to the travel of core rod 62 over a range of plus or minus 0.050 inches from a preselected null point. The output voltage signal reaches a level of two volts DC at the rod 62 maximum displacement position.

Bar 58 is securely attached to housing 18 by means of threaded fastener 61, which is secured against bar 58 and holds it against a shoulder on shaft 64. Shaft 64 is affixed to the wall of housing 18. A knob 66 is attached to a potentiometer shaft 68 coupled to a potentiometer 34. Rotation of knob 66 causes a resistance variation between potentiometer terminal 72 and terminals 73 and 74. The variable resistance setting provided at terminal 72 is used to develop a pressure set point signal as will be hereinafter described.

Figure 4:
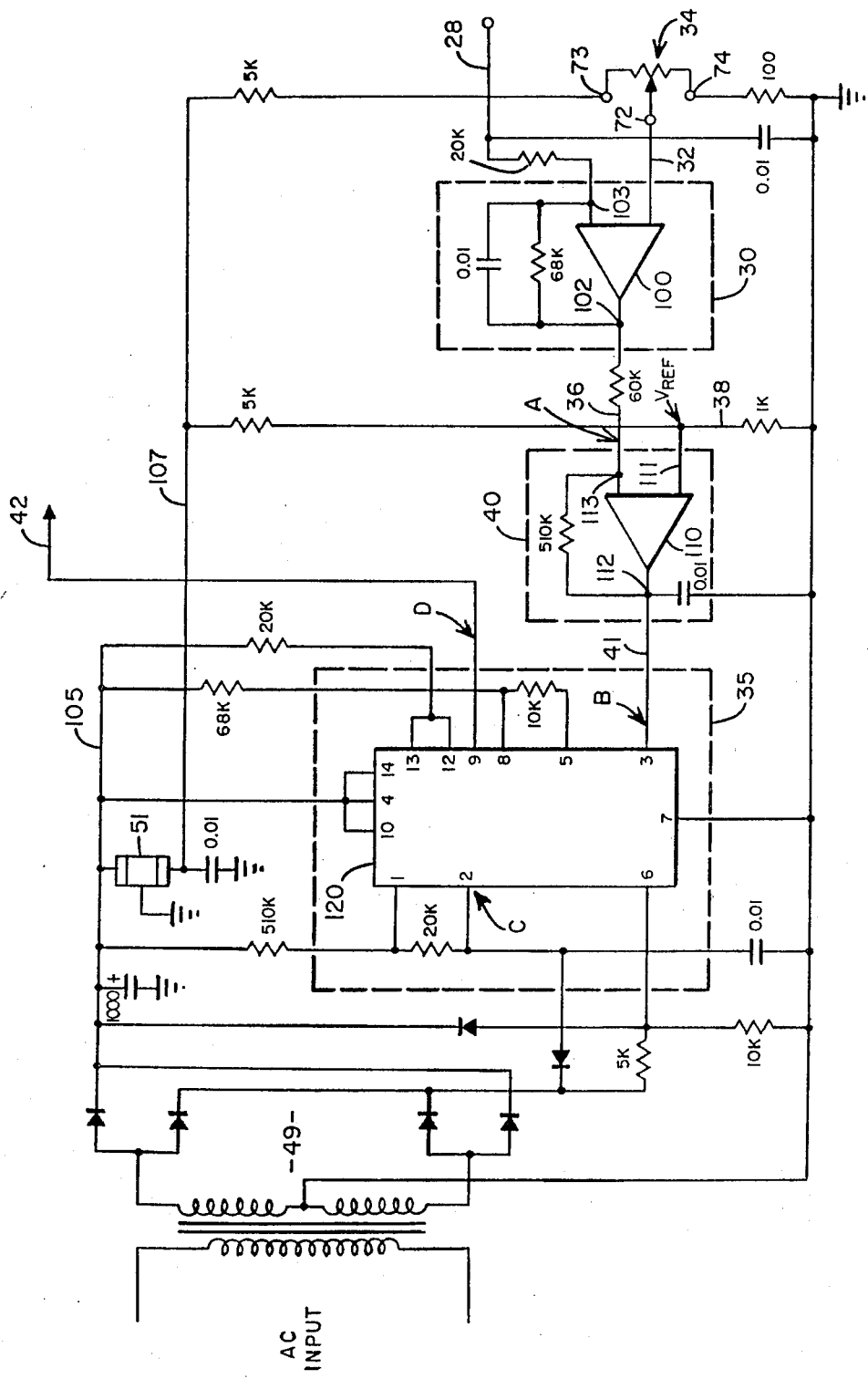
FIG. 4 shows a schematic diagram of a portion of the invention.

Referring next to FIG. 4, a portion of the electronic circuit of the present invention is shown. Potentiometer 34 is serially connected into a resistor divider network, terminal 73 being connected to a 5,000 ohm (5K) resistance, and terminal 74 being connected to a 100 ohm resistance. Potentiometer 34 is preferably a 2,000 ohm (2K) potentiometer. Terminal 72 of potentiometer 34 is connected to an input terminal of an operational amplifier 100, which is a type commonly and commercially available. For example, National Semiconductor Corporation Type LM324 consists of a single semiconductor package having four independent, high-gain, internally frequency-compensated operational amplifiers designed specifically to operate from a single power source over a wide range of voltages. This type designation is applicable to the operational amplifiers described in connection with the present invention. Operational amplifier 100 has a parallel R-C feedback network connected between its output terminal 102 and a second input terminal 103, which combination forms comparator 30. Input terminal 103 is also connected via an R-C network to signal line 28 from differential transformer 60. A second signal line (not shown) from differential transformer 60 is connected to a common or ground connection.

The signal on output line 36 of comparator 30 is coupled to the input 113 of operational amplifier 110. A second input 111 to operational amplifier 110 is connected to a resistance divider network, and thereby receives a constant DC voltage input. The output 112 of operational amplifier 110 is connected back to input 113 via a resistor and is connected to ground via a capacitor, and the entire circuit combination comprises comparator 40. The voltage output of comparator 40 is a DC signal whose magnitude is proportional to the error signal difference between the actual pump pressure and the pressure set point. This output voltage is coupled to timer 35 via line 41.

Timer 35 comprises a combination of electrical components and semiconductor circuits, and is capable of generating a timed gating signal. The semiconductor element 120 of timer 35 is a commercially available product designated type LM556, and manufactured by National Semiconductor Corporation. In FIG. 4, the small numerals adjacent input and output connections on semiconductor 120 are indicative of the pin connections of the LM556 semiconductor circuit. For example, output line 41 of comparator 40 is connected to pin 3 of circuit 120. Circuit 120 has a number of other inputs and outputs, the functions of which will be described in more detail hereinafter, its principal output being line 42, which is connected to SCR drive circuit 50. Line 42 carries a gating signal for controlling the firing time of the SCR elements in SCR drive circuit 50.

Power is supplied to the circuit of FIG. 4 by means of a conventional transformer and rectifier circuit 49. This circuit produces unregulated DC voltage at approximately 7 volts DC on line 105, and regulated voltage at 6 volts DC on line 107. A conventional semiconductor voltage regulator 51 is connected between lines 105 and 107. All resistor values are designated on FIG. 4 in ohms, and capacitor values are designated in microfarads.

FIG. 5 shows a schematic diagram of the silicon controlled rectifier (SCR) drive circuit 50 which forms a part of the present invention. This circuit may be obtained commercially in the form shown, specifically from Gentron Corporation under the designation "Powertherm B Series" bridge circuit. This circuit converts an AC input voltage to a DC voltage level, the magnitude of the DC voltage output being a function of the portion of the AC voltage cycle during which the gating signals are applied via line 42. The output of SCR drive circuit 50 is developed between lines 44 and 45. Line 45 may be a common or ground connection, and line 44 is connected to the field winding of DC motor 14.

The operation of the invention will be described with reference to the drawings, including FIGS. 6A and 6B. FIG. 6A illustrates pertinent voltage wave forms under conditions of relatively slow pump operation; FIG. 6B illustrates voltage wave forms under conditions of relatively fast pump operation. In other words, FIG. 6A illustrates conditions wherein the actual pumping pressure is very nearly equal to the set point pressure, and FIG. 6B illustrates conditions wherein the actual pumping pressure is significantly lower than the set point pressure. In both FIG. 6A and 6B the voltage waveforms A-E are measured at the circuit points identified in FIGS. 4 and 5. The voltage A which is the output of comparator 30 is a DC voltage representative of the error signal developed as a difference between the set point pressure and the actual pump output pressure. This signal is represented as voltage $V_1$ in FIG. 6A and $V_2$ in FIG. 6B; it is apparent that the error voltage A is of greater magnitude in FIG. 6B than in FIG. 6A, indicating a greater demand for increased pumping volume. This signal is coupled into comparator 40, wherein it is compared against a reference signal $V_{REF}$, and the output of comparator 40 is a DC voltage shown as waveform B which is a magnitude, subtracted from $V_{REF}$, proportional to the magnitude of the error voltage A. In FIG. 6A the voltage $V_3$ indicates a relatively small departure from $V_{REF}$, in FIG. 6B the voltage $V_4$ indicates a relatively larger departure from $V_{REF}$. Voltage waveform C is a ramp voltage applied to pin 2 of timer 120 at twice the line frequency. Voltage waveform C proceed from zero to a voltage $V_F$ to provide a constant time base under all operating conditions. The internal logic of timer circuit 120 generates an output gating signal D whenever ramp voltage C equals or exceeds voltage waveform B. This is shown as voltage waveform D in FIGS. 6A and 6B, and it is apparent that the gating signal D is turned on for a shorter period of time in FIG. 6A than it is in FIG. 6B. Voltage waveform D is applied on line 42 and is used as the gating signal to drive the SCR circuit 50. This signal triggers the SCR gates and therefore permits a DC output signal to be developed on line 44. This is shown in FIG. 6A and 6B as voltage waveform E, and it is apparent that the DC voltage of FIG. 6A is of lower magnitude than the DC voltage of FIG. 6B. Voltage waveform E provides an average DC drive current into motor 14 to create a motor drive torque and thereby to drive pump 12.

Under operating conditions, DC motor 14 will drive pump 12 at a relatively high rate of speed until the pump output pressure begins to approach the set point pressure. As the two pressures become equal the drive voltage into motor 14 will diminish until motor 14 is no longer able to reciprocate pump 12 against its output pressure. At this point motor 14 will stall and will continue to draw only the current required to maintain an output torque necessary to maintain the set point pressure at the output of pump 12. As soon as the pressure in the fluid delivery line is reduced, as for example by triggering the spray valve in spray gun 24, the liquid pressure will incrementally drop and thereby develop the electrical drive signals to increase the motor drive voltage in motor 14 to reciprocate pump 12 to build the pressure back up to the set point pressure.

The present invention may be embodied in other specific forms without departing from the spirit or essential attributes thereof, and it is therefore desired that the present embodiment be considered in all respects as illustrative and not restrictive, reference being made to the appended claims rather than to the forgoing description to indicate the scope of the invention.

What is claimed is:

1. A variable speed reciprocable pumping system having a DC drive motor mechanically linked to drive a reciprocable pump, comprising
(a) means for sensing the pressure of liquid pumped by said pump, including means for developing a voltage representative of said pressure;
(b) means for manually setting a voltage representative of a pressure set point for said pump;
(c) means for comparing said manually set voltage and said pressure developed voltage, and for generating an error signal representative of said comparison;
(d) means for transforming said error signal into a timed signal having a time duration proportional to said error signal;
(e) a silicon controlled rectifier circuit for transforming an AC power voltage input to a DC voltage output, having SCR gates for controlling the magnitude of said DC voltage output, said circuit DC voltage output being coupled to said DC drive motor, and said SCR gates being coupled to said timed signal.

2. The system of claim 1, wherein said means for sensing pressure further comprises a curved tube coupled for liquid flow therethrough, wherein the deflection of said tube is proportional to the pressure of said liquid.

3. The system of claim 2, wherein said means for sensing pressure further comprises a linear differential transformer mechanically linked to said tube.

4. The system of claim 1, wherein said means for transforming said error signal into a timed signal further comprises means for developing a voltage ramp having a predetermined period and means for comparing the error signal with the voltage ramp.

5. The system of claim 4, wherein said means for comparing further comprises a logic gating circuit for developing a gating signal when said voltage ramp and said error signal become equal.

6. The system of claim 5, wherein said means for comparing said manually set voltage and said pressure developed voltage further comprise a first operational amplifier comparator for generating a signal representative of the difference between said two voltages, and a second operational amplifier comparator for receiving said difference signal at one input and for receiving a reference voltage at a second input and for generating an output signal representative of the difference between said reference voltage and said difference signal.

7. A liquid pumping system powered from an alternating current source, comprising
(a) a liquid pump;
(b) a DC electric motor mechanically coupled to said liquid pump;
(c) a silicon-controlled circuit having inputs connected to said alternating current source and having an output connected to said DC electric motor, said circuit having gating signal inputs for controlling the conductivity of said circuit;
(d) a gating signal circuit having an output connected to said gating signal input, said gating signal circuit having a first input for receiving a timing signal and a second input for receiving an error signal, wherein coincidence of the respective magnitudes of said error signal and said timing signal generates said gating signal;
(e) a ramp circuit for generating a voltage ramp at a predetermined frequency, said ramp circuit having an input coupled to said alternating current source and having an output connected to said gating signal circuit first input;
(f) a comparison signal circuit having a first and second signal input and having an output bearing a signal representative of the difference between said first and second input signals, said output being connected to said gating signal circuit second input;
(g) a variable voltage control having means for manual adjustment, said variable voltage control connected to said comparison signal circuit first input; and
(h) a pressure to voltage transducer having an output voltage signal representative of pressure sened by said transducer, said output voltage signal coupled to said comparison signal second input and said pressure transducer coupled to said liquid pump for sensing pump output pressure.

8. The pumping system of claim 7, wherein said pressure to voltage transducer further comprises an arcuate tube connected in liquid flow relation to the output of said liquid pump, and an electromechanical member coupled to said tube for sensing deflection of said tube and for generating an electrical signal responsive to said deflection.

9. The pumping system of claim 8, wherein said electromechanical member further comprises a differential transformer having a movable core rod coupled to said tube.

10. The pumping system of claim 9, wherein said variable voltage control further comprises a patentiometer connected to a DC voltage source.

11. A DC motor speed control circuit powered from an AC line source and operatively connected to a DC motor which reciprocates a pump, said pump having an output liquid flow line, comprising (a) a pressure transducer connected to said output liquid flow line, said pressure transducer developing a first voltage signal proportional to the liquid pressure in said output liquid flow line;

(b) a manually adjustable control, said control developing a second output voltage signal proportional to a pressure set point;

(c) means for comparing said first and second voltage signals and for developing an error signal inversely proportional to the difference between said signals;

(d) a rectifier circuit adapted for connection to said AC line source, said rectifier circuit having means for providing a rectified DC voltage;

(e) means for generating a voltage ramp signal at the frequency of said rectified DC voltage;

(f) means for comparing said error signal and said voltage ramp signal and for generating a gating signal during the portion of said voltage ramp signal equal to or greater than said error signal;

(g) means for coupling said rectified DC voltage to said DC motor, said means having signal input means coupled to receive said gating signal and for delivering said rectified DC voltage to said DC motor when said gating signal is present.

12. The circuit of claim 1, wherein said pressure transducer further comprises a pair of arcuate tubes coupled in liquid flow relation to said output liquid flow line, said tubes having interconnected free ends, and means for sensing deflection of said interconnected free ends.

13. The circuit of claim 12, wherein said means for sensing deflection further comprises a linear differential transformer circuit having a movable core rod coupled to said free ends.

* * * * *